W. SPENCER.
DYEING MACHINE.
No. 20. Reissued May 28, 1840.
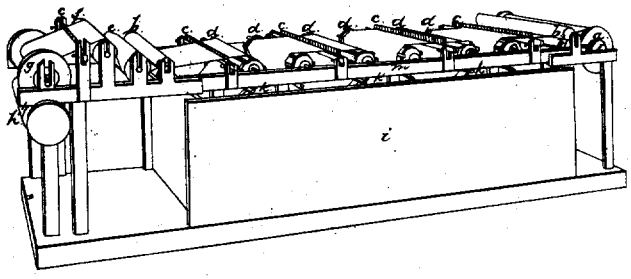
Fig 1
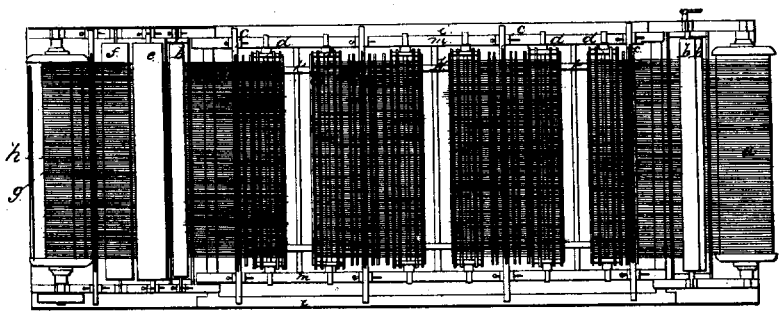
Fig 2.
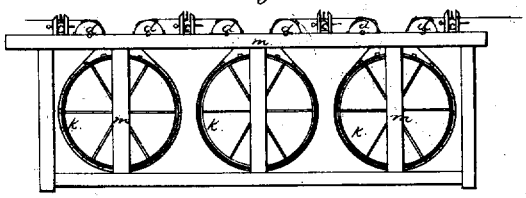
THE NORRIS PETERS CO., PHOTO-LITHO., WASHINGTON, D. C.

UNITED STATES PATENT OFFICE.

WILLIAM SPENCER, OF LOWELL, MASSACHUSETTS.

IMPROVEMENT IN MACHINES FOR DYEING YARN FROM THE BEAM.

Specification forming part of Letters Patent No. 947, dated September 25, 1838; Reissue No. 20, dated May 28, 1840.

*To all whom it may concern:*

Be it known that I, WILLIAM SPENCER, of Lowell, in the county of Middlesex and State of Massachusetts, have invented a new and useful Machine for Dyeing Yarn from the Beam, an imperfect specification of which has been given heretofore, and Letters Patent of the United States have been granted to me, the said SPENCER, bearing date the 25th day of September, 1838, for the term of fourteen years from said date, which Letters Patent are deemed inoperative by reason of the imperfection of said specification, happening through inadvertance and mistake, without any intentional fraud or deception, and having been surrendered to obtain new Letters Patent for the residue of said term; and for that purpose I now specify my said invention and machine more fully and accurately, reference being had to the drawings hereto annexed, and made a part of this specification, in each of which drawings the same letters refer to the same parts of the machine.

*a* is a common beam of yarn. *b b* are a pair of squeeze-rollers. *c c c c* are reeds supported at the ends by stands attached to the frame *m m m* of the machine. *d d d d* are slatted reels. *e* and *f* are two steam-cylinders. *g* is a yarn-beam revolving on stands attached to the frame and resting on the roller *h*, to which the power moving the machine is applied. *i* is a vat containing the dye with which the yarn is to be colored. *k k k* are slatted reels of a larger size, made to revolve in the vat *i*, supported by parts of the frame extending into the vat. The part of the beam *a* below the axle may be immersed in a vat of water or coloring-matter, which may be made to boil by the introduction of a steam pipe and cock, as at *z*, and the yarn thus boiled before it receives the dye.

The operation of this machine is as follows: The threads of yarn pass from the beam *a* between the squeeze-rollers *b b*, and through the reed *c*, and over the slatted reels *d* which are nearest to the beam *a*, and then pass downward into the vat *i*, and around under the nearest slatted reel *k*, then upward out of the vat and over the next slatted reel *d*, and through the next reed *c*, and again into the vat and under the second reel *k*, and then upward over the next reel *d*, and so on till they have passed through the reeds and around the whole series of the reels in the vat and on the frame, and then pass between the second pair of squeeze-rollers *b b*, immersed in clean water, by which the yarn is rinsed and squeezed, and then around the steam-cylinders *e* and *f*, by which they are dried, and then through the last reed *c* onto the beam *g*, to which the ends of the threads may be attached. The moving power, which may be a crank or belt and pulley, is then applied to the roller *h*, which, as it revolves, carries around the beam *g*, resting upon it, and the yarn is wound from the beam *a* onto the beam *g*, passing on its way through the dye-vat, around the reels and steam-cylinders, through the reeds and between the squeeze-rollers, as above described. The reeds and reels keep each thread separate from the others, and prevent the fibers of the different threads from becoming entangled with each other in the process of dyeing till they are dried by the steam-cylinders and passed onto the beam *g*, ready for the dressing-frame. By changing the moving power to the beam *a* the yarn may be wound backward and forward through the dye any number of times desired, or the series of reeds and reels may be extended or diminished, as the nature of the dyeing material may render expedient.

Instead of the slatted reels I have sometimes used grooved rollers to keep the threads separate while passing through the process, the rollers being, respectively, about the same diameter as the several smaller reels before described, with as many grooves cut around them as there are threads on the beam, and one thread running in each groove; but the slatted reels answer the purpose as well, and are less difficult to manage.

What I claim as my invention, and wish to secure by Letters Patent, is—

The combination of the slatted reels or grooved rollers with the reeds, squeeze-rollers, and steam-cylinders, as hereinbefore described, and the application of said combination to the beam of yarn for the purpose of passing the yarn through a dye and rinsing and drying the same and replacing it on a beam, and keeping the threads separate from each other during the process.

WILLIAM SPENCER.

Witnesses:
J. W. MANSUR,
ALFRED GILMAN.